US009064149B1

(12) United States Patent
Dhua et al.

(10) Patent No.: US 9,064,149 B1
(45) Date of Patent: Jun. 23, 2015

(54) VISUAL SEARCH UTILIZING COLOR DESCRIPTORS

(71) Applicant: A9.com, Inc., Palo Alto, CA (US)

(72) Inventors: Arnab Sanat Kumar Dhua, Mountain View, CA (US); Himanshu Arora, Sunnyvale, CA (US); Sunil Ramesh, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 175 days.

(21) Appl. No.: 13/842,328

(22) Filed: Mar. 15, 2013

(51) Int. Cl.
*G06K 9/00* (2006.01)

(52) U.S. Cl.
CPC .................. *G06K 9/00536* (2013.01)

(58) Field of Classification Search
None
See application file for complete search history.

(56) References Cited

U.S. PATENT DOCUMENTS

| 5,748,764 | A | 5/1998 | Benati et al. | |
|---|---|---|---|---|
| 6,181,817 | B1 * | 1/2001 | Zabih et al. | 382/170 |
| 6,195,458 | B1 * | 2/2001 | Warnick et al. | 382/173 |
| 6,246,804 | B1 | 6/2001 | Sato et al. | |
| 6,741,655 | B1 | 5/2004 | Chang et al. | |
| 7,337,455 | B2 * | 2/2008 | Agnihotri et al. | 725/32 |
| 7,421,125 | B1 | 9/2008 | Rees | |
| 8,520,935 | B2 * | 8/2013 | Wang et al. | 382/154 |
| 2003/0174882 | A1 | 9/2003 | Turpin | |
| 2008/0044081 | A1 | 2/2008 | Lieb | |
| 2008/0046409 | A1 | 2/2008 | Lieb | |
| 2008/0046410 | A1 | 2/2008 | Lieb | |
| 2009/0281925 | A1 * | 11/2009 | Winter et al. | 705/27 |
| 2010/0225935 | A1 | 9/2010 | Minchew et al. | |
| 2011/0013805 | A1 * | 1/2011 | Okada et al. | 382/103 |
| 2011/0058748 | A1 | 3/2011 | Trifonov et al. | |
| 2011/0188780 | A1 * | 8/2011 | Wang et al. | 382/293 |
| 2013/0151535 | A1 * | 6/2013 | Dusberger et al. | 707/747 |

OTHER PUBLICATIONS

USPTO Non-Final Office Action dated Mar. 11, 2013, for U.S. Appl. No. 12/699,735, 9 pages.
USPTO Notice of Allowance dated Jul. 24, 2013, for U.S. Appl. No. 12/699,735, 6 pages.
USPTO Non-Final Office Action dated Dec. 16, 2013, for U.S. Appl. No. 14/071,557, 7 pages.
USPTO Final Office Action dated Apr. 29, 2014, for U.S. Appl. No. 14/071,557, 8 pages.
USPTO Notice of Allowance dated Nov. 7, 2014, for U.S. Appl. No. 14/071,557, 6 pages.

* cited by examiner

*Primary Examiner* — Samir Ahmed
*Assistant Examiner* — Menatoallah Youssef
(74) *Attorney, Agent, or Firm* — Hogan Lovells US LLP

(57) ABSTRACT

Various embodiments provide a method for computing color descriptors of product images. For example, a number of fine color representatives can be determined to describe color variation in an image as a histogram by assigning a saturation value and a brightness value to a plurality of color hues. For each pixel of the image, the closest color among a defined fine color representative set is computed. In this example, each of the pixels is assigned a color ID corresponding to their closest matching fine color representative and at least one family color ID corresponding one or more pure color families. In this example, a histogram of the color representatives and a histogram for the color families are computed. A single color vector descriptor for the image is then determined by combining the family histogram with the color representative histogram.

24 Claims, 8 Drawing Sheets

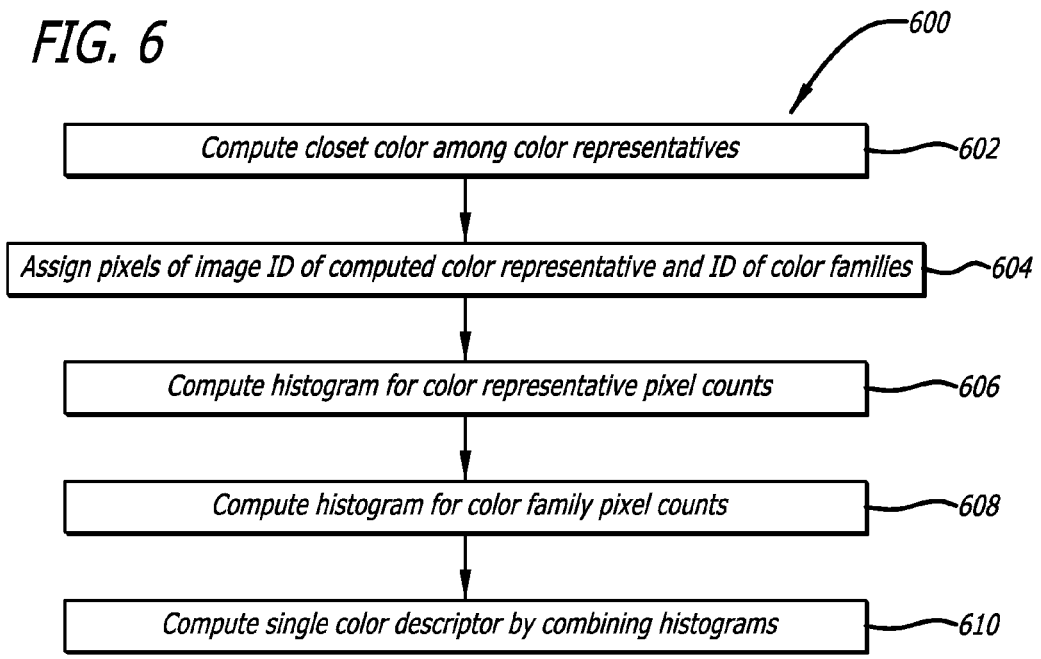
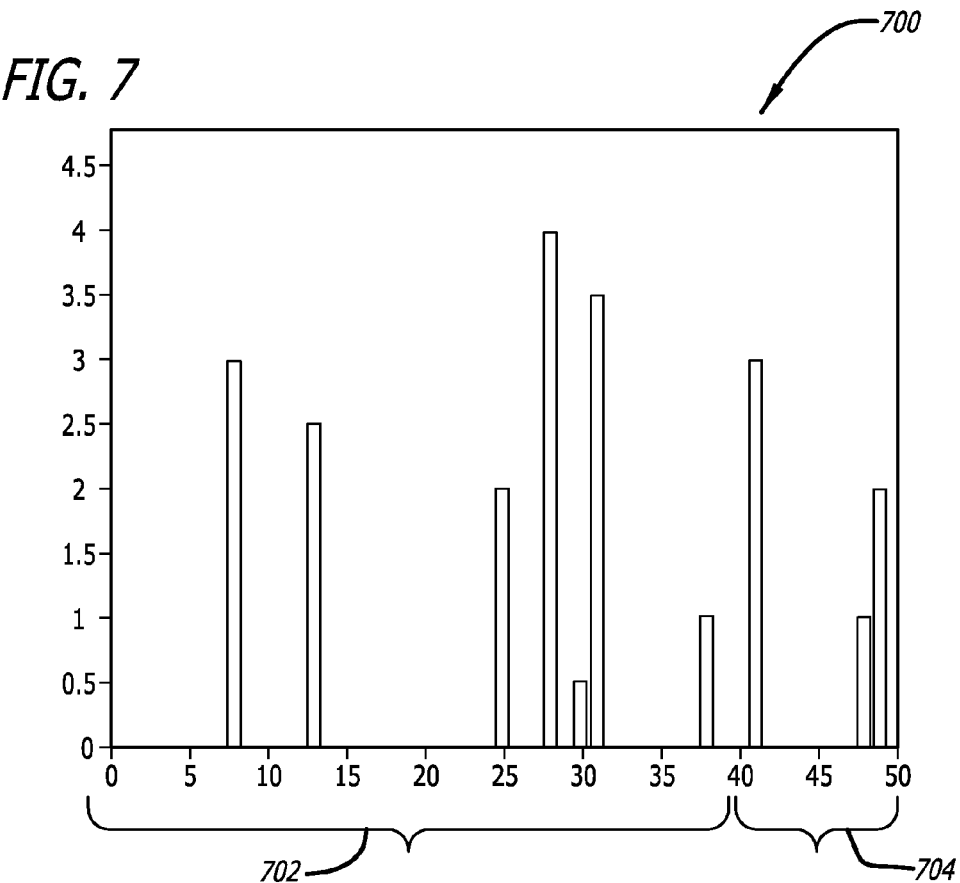

VISUAL SEARCH UTILIZING COLOR DESCRIPTORS

BACKGROUND

Users are increasingly utilizing electronic devices to obtain various types of information. For example, a user wanting to purchase a pair of shoes might access an electronic marketplace in order to search the types of shoes offered through that marketplace. Unless the user knows an exact brand or style of shoe that the user wants, however, the user might have to search through hundreds or thousands of different shoes using various options to attempt to locate the type of shoe in which the user is interested. In many cases, the shoes are organized by categories such as "casual" and "formal" which only lend general guidance to the types of shoes in each of the categories. Color can also be an important cue for narrowing search results while browsing. In order to facilitate such a browsing experience, each product image needs to be tagged with the color of the product contained therein. However, manually tagging each and every product is not scalable or practical. Manually tagging each product is not scalable and hence there is a need for automated algorithms to analyze the visual content of these images and tag them with color contained therein. Therefore, as technology advances, it can be advantageous to adapt the ways in which product information is made available to users and also the ways in which users access the same.

BRIEF DESCRIPTION OF THE DRAWINGS

Various embodiments in accordance with the present disclosure will be described with reference to the drawings, in which:

FIG. 6 illustrates an example process for computing a color descriptor that can be used in accordance with at least one embodiment;

FIG. 7 illustrate an example histogram in accordance with at least one embodiment;

DETAILED DESCRIPTION

Systems and methods in accordance with various embodiments of the present disclosure may overcome one or more of the aforementioned and other deficiencies experienced in conventional approaches to determining information about items using a computing device. In particular, various embodiments provide a method of determining color descriptors for images. In at least some embodiments, an image is described as a histogram over a number of representative colors for encoding the color content in product images. In one example, the color content of two images can be compared by computing their associated color descriptors and computing the dot product, or other distance metric, between the same to determine a similarity measure of the color for the two images. In another example, the pure color content of an image can be determined, which can then be used in a "query by color" search.

In at least one embodiment, a number of fine color representatives are determined for describing color variation in an image as a histogram by assigning a saturation value and a brightness value to a plurality of color hues. For each pixel of the image, the closest color among a defined fine color representative set is computed. In this example, each of the pixels is assigned a color ID corresponding to their closest matching fine color representative and at least one family color ID corresponding one or more pure color families. In this example, a histogram of the color representatives and a histogram for the color families are computed. A single color vector descriptor for the image is then determined by combining the family histogram with the color representative histogram.

Therefore, a fine grained set of representatives that adequately cover the color space, along with a corresponding set of family color representatives that substantially respect perceptual color boundaries, are chosen. The final descriptor is a concatenation of these two types of representatives. Accordingly, the color content of two images can be matched by extracting the descriptors and comparing them using Euclidean distance or an image can be matched against a pure color by fabricating a color descriptor as described herein.

Various other functions and advantages are described and suggested below as may be provided in accordance with the various embodiments.

Figure 1:
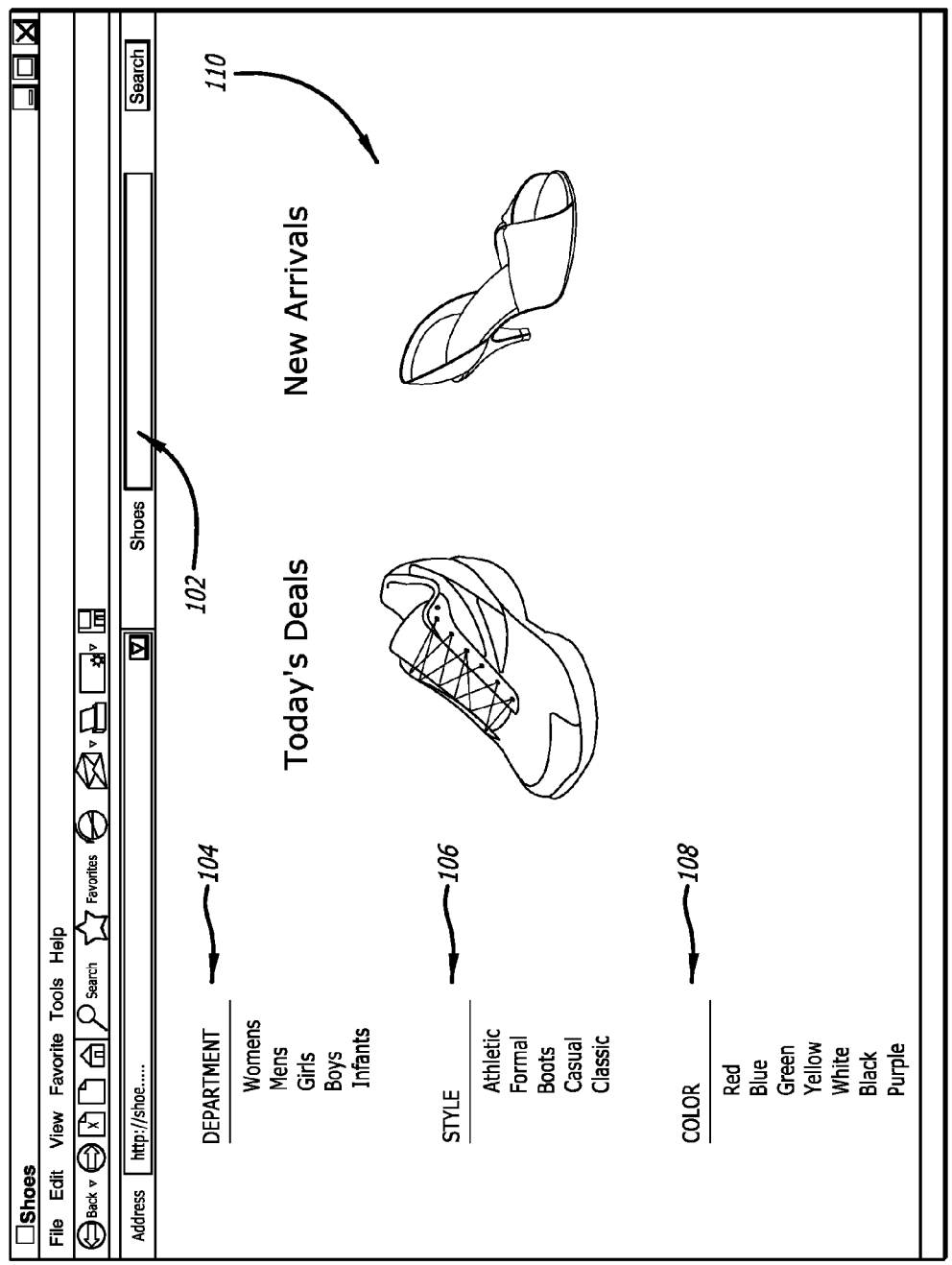
FIG. 1 illustrates an example interface that a user can use to locate an item in accordance with various embodiments.

FIG. 1 illustrates an example interface 100 that can be presented to a user searching for a product or item, such as a pair of shoes. In this example, the user might log onto a site that sells shoes, navigate to a page of an electronic marketplace that sells shoes, or otherwise access electronic content associated with various types of shoes. In this example, the user can utilize a number of conventional approaches in order to attempt to locate shoes that are of interest to the user. For example, the user can enter search terms into a search field 102 that can be compared against a search index to attempt to locate matching items. For example, the user might type in "men's formal shoes" to obtain search results matching some or all of those query terms. Alternatively, the user might select various categories or criteria in order to obtain a view type of item. For example, a user might be able to select from a first set of categories 104 in order to determine whether the search should include shoes for men, women, or children. The user also might select other criteria 106, such as a certain style in which the user is interested. Further, the user also might narrow a list of items by filtering by color 108. There may also be other selectable options 110 displayed as well, such as popular or seasonal shoes, or shoes in which the user might be interested based on past purchases or views, or other such information.

As discussed, color can be an important filter for narrowing search results while browsing, especially for apparel products such as shoes, dresses, and the like. To facilitate such a browsing experience, each product image needs to be tagged with the color contained therein. Manually tagging all products is not scalable and, hence, there is a need for an automated algorithm to analyze the visual content of these images and tag the same with the color contained therein. Therefore, in at least one embodiment, color of an object or product in an image can be described as a histogram over a number representative colors. For example, at least a portion of each red, green, and blue (RGB) pixel in an image can be mapped to one or more of the representative colors and the corresponding counts can be aggregated to form a vector color descriptor of the image. The choice of representative colors is critical to both matching complexity and accuracy. For example, one possible choice includes all RGB color triplet combinations in the range [0-255]. This, however, leads to an overly large descriptor which is not only computationally intensive to match, but likely too specific for many color variations to be perceived by the human eye. For example, if two images with very similar colors have slightly different RGB values, their corresponding descriptors may return a low match score when comparing them. Conversely, the other extreme is choosing too few color representatives, where two image's corresponding descriptors may return a high match score for very different colors. Choosing a proper number of color representatives is, therefore, critical to properly describing and, subsequently, matching colors of an object in an image.

Choosing Color Representatives

Figure 2:
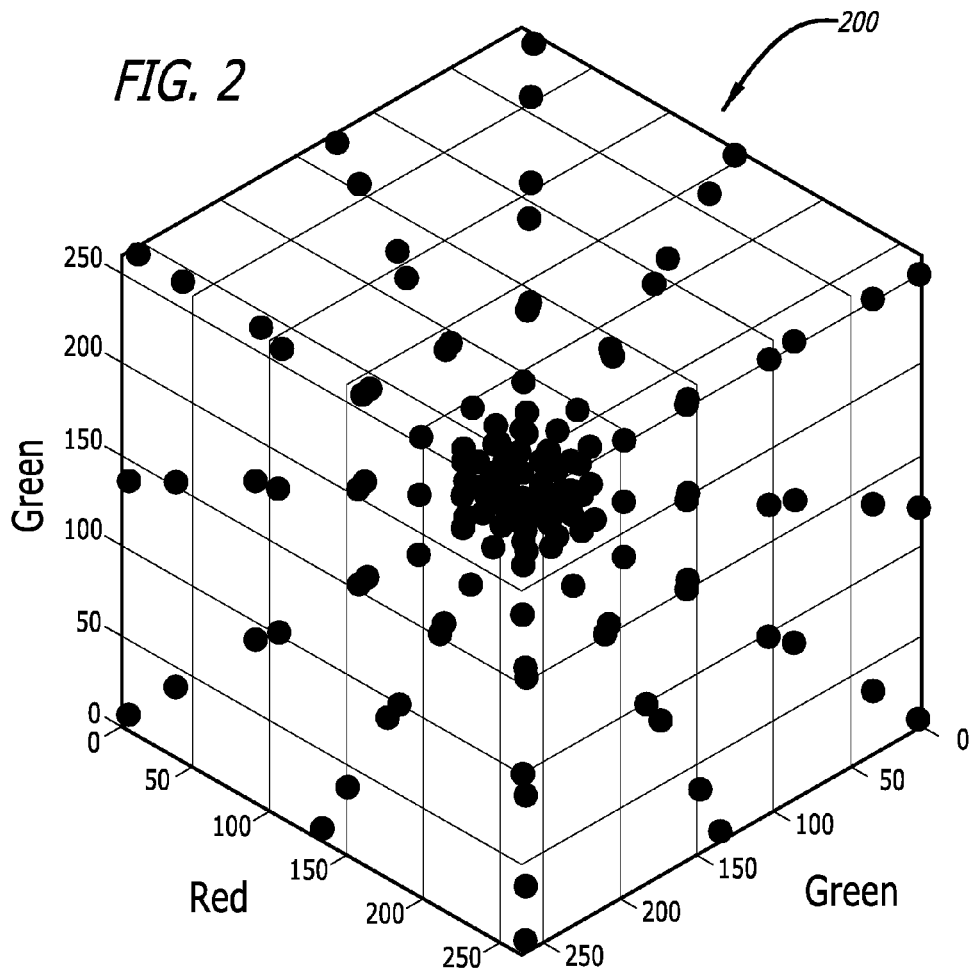
FIG. 2 illustrates an example RGB space graph in accordance with at least one embodiment.

Color representatives can be chosen by essentially segment the entire color gamut into regions where all colors are considered equal. FIG. 2 represents an example RGB-Space graph 200. In this example, each location within the 3-dimensional space represents a different combination of red, green, and blue, yielding all color possibilities. Besides being computationally intensive, uniformly dividing the 3-dimensional RGB space to determine color representatives, in accordance with various embodiments, is not desirable for a number of reasons. Another consideration in choosing the color representatives, therefore, is that they should respect perceptual boundaries between colors. For example, color variations at low intensity are often difficult for the human eye to disambiguate, so there does not need to be as many color segments or categories for low intensity regions. Further, the color content of each segment might be different, or yield different results, at different brightness values. A different segmenting method for choosing color representatives is, therefore, desirable.

Figure 3:
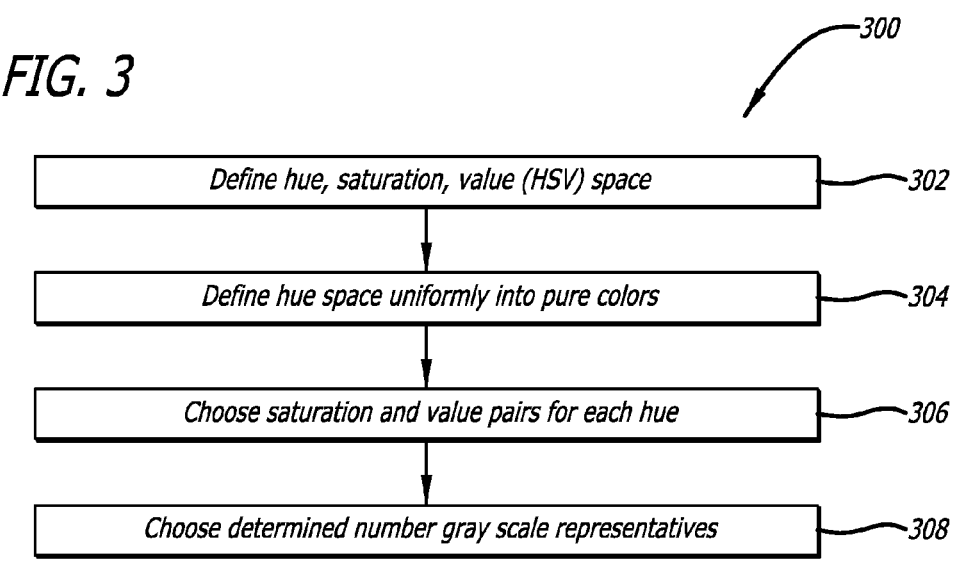
FIG. 3 illustrates an example process for determining color representatives that can be used in accordance with at least one embodiment.
Figure 4:
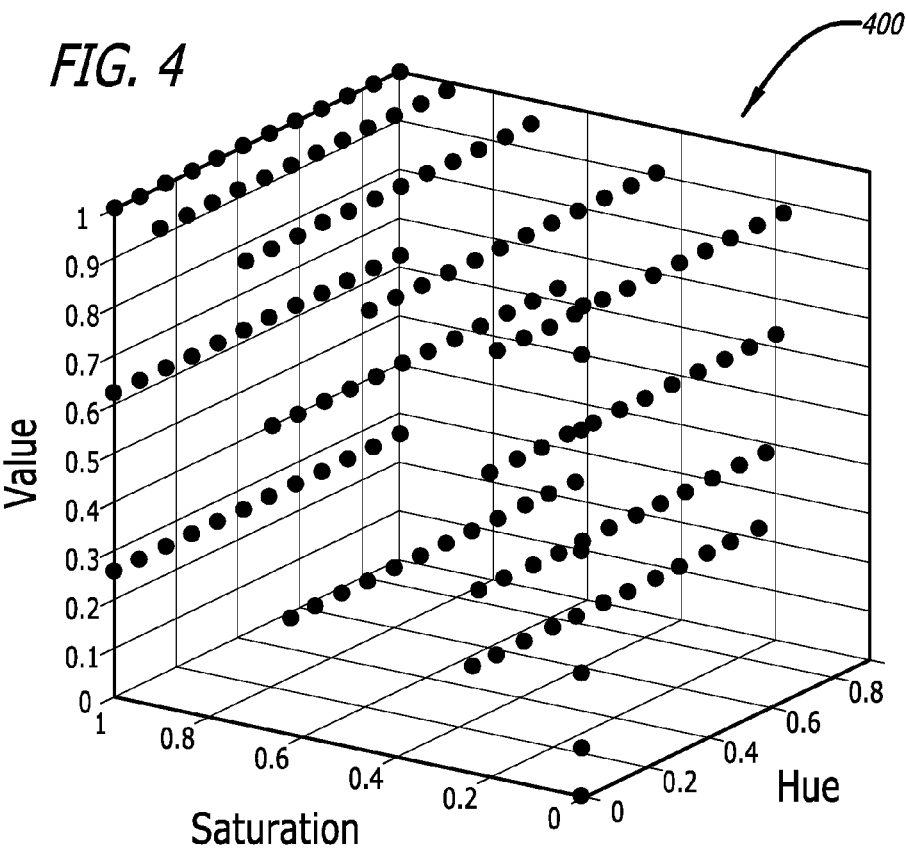
FIG. 4 illustrates an example Hue-Saturation-Value (HSV) space graph in accordance with at least one embodiment.

FIG. 3 illustrates an example process 300 for choosing color representatives that can be used in accordance with various embodiments. In this example, a Hue, Saturation, Value (HSV) Space is defined 302. FIG. 4 represents an example HSV Space graph 400 that can be used in accordance with various embodiments discussed herein. The HSV space more closely segments colors by how the human eye perceives the same and, therefore, enables the choosing of fewer more perceptually relevant color segments by segmenting the chromaticity component (hue and saturation) of each color from the brightness component (value). In order to choose color representatives from the HSV-space, the hue space is uniformly divided 304 into $N_h$ pure colors and $N_{sv}$ saturation and value pairs are chosen 306 for each hue, such that more saturation points are chosen for higher brightness values (Value). For example, more color representatives are, therefore, assigned to more saturation values for high brightness values relative to color representatives assigned saturation values for low brightness values. Additionally, a few grayscale representatives with no color are chosen 308. Each point on the graph 400 represents an example chosen color in the HSV space. Additionally, these points also correspond to points in the RGB space of graph 200. Therefore, in this example, there are $N_C=N_h*N_{sv}$ fine grained color representatives, each with a RGB value $C_i=(R_i, G_i, B_i)$.

Choosing Color Families

Figure 5:
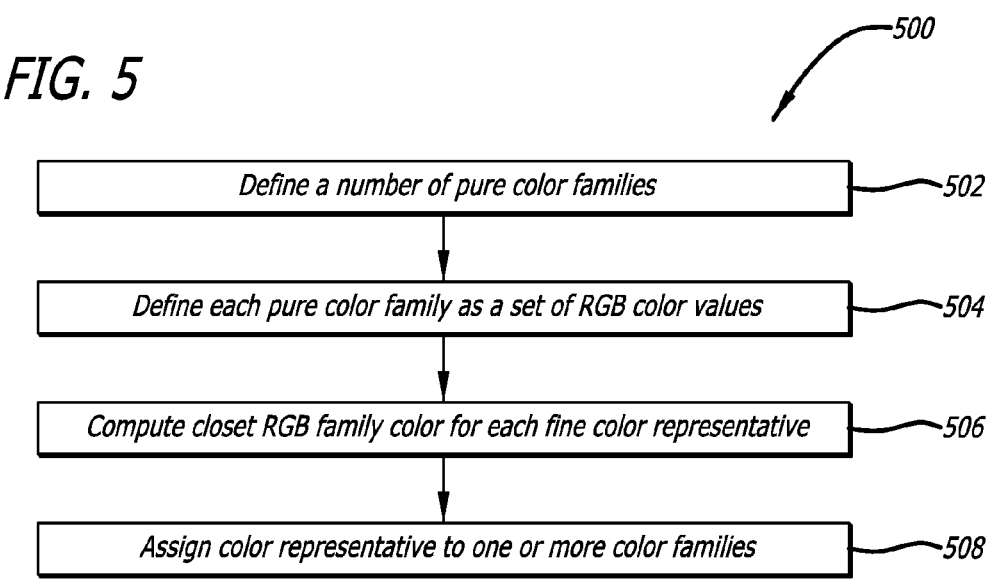
FIG. 5 illustrates an example process for assigning color representatives to pure color families that can be used in accordance with at least one embodiment.

Each of the fine grained color representatives, described above, is assigned to one or more color families to provide a coarser set of representatives to help generalize the descriptors to regions in the color gamut that are sparsely populated by fine grained color representatives. FIG. 5 illustrates an example process 500 for assigning color representatives to pure color families that can be used in accordance with various embodiments. In this example, a set of pure color families are defined 502 and this set is described 504 in terms of a finite number or range of RGB color values. In this example, the closest RGB family color is computed 506 for each of the color representatives. As described above for the fine color representatives, the set color families are also chosen to respect perceptual color boundaries of the human eye. For example, if two colors are at a boundary of two pure colors, using only fine color representatives will often lead to an equal similarity score being calculated for both colors. Therefore, each color representative is assigned 508 to a pure color family to provide a needed bias towards the correct pure color. If, for example, there are multiple color representatives within a determined distance threshold, the corresponding representatives can be assigned to all the respective color families.

Color Descriptor Extraction

Having a defined set of color representatives and color families, a color descriptor of an image can be computed. FIG. 6 illustrates an example process 600 for extracting color descriptors that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a number of fine color representatives are determined to describe color variation in an image as a histogram by assigning a saturation value and a brightness value to a plurality of color hues for each of a set of colors. For each pixel in the image, the closest color among the fine color representatives is computed 602. Each of the pixels is assigned to a color ID for the closest matching fine color representative and to at least one pure color family having a corresponding family ID. In this example, a global histogram of the color representatives is computed 606 for at least a portion of the pixels. Additionally, a color family histogram is also computed 608. A single color vector descriptor for the image is computed 610 by normalizing and combining (or concatenating) the color family histogram with the color representative histogram with a weighting factor. FIG. 7 illustrates such an example histogram 700 with the color representative histogram portion 702 concatenated with the color family histogram portion 704. Further, the descriptor can be scaled to have a unit Euclidean norm. In one example, the color family histogram is weighted higher, 1.2 for example, when combining the histograms than the color representative histogram, 1.0, for example. There are some applications, however, where the color family histogram isn't always weighted higher. For example, the color representative histogram can be weighted higher when determining a visual similarity between two items or images, as will be described below.

In at least one embodiment, the computation of the closest color among the fine color representatives can be performed in a color space other than RGB space or HSV space, as discussed above. For example, Lab color space (CIELAB), which incorporates a dimension L for lightness and 'a' and 'b' for color-opponent dimensions could also be utilized for assigning image pixels to the fine colors. As used herein, a color opponent is associated with a process in color theory that suggests that color perception is controlled by the activity of two opponent systems; a blue-yellow mechanism and a red-green mechanism. Accordingly, the HSV and Lab color spaces can be utilized for different purposes. For example, the HSV space can be used to lay out the fine colors representatives and Lab space to compute distances.

Color Descriptor Comparison

Figure 8:
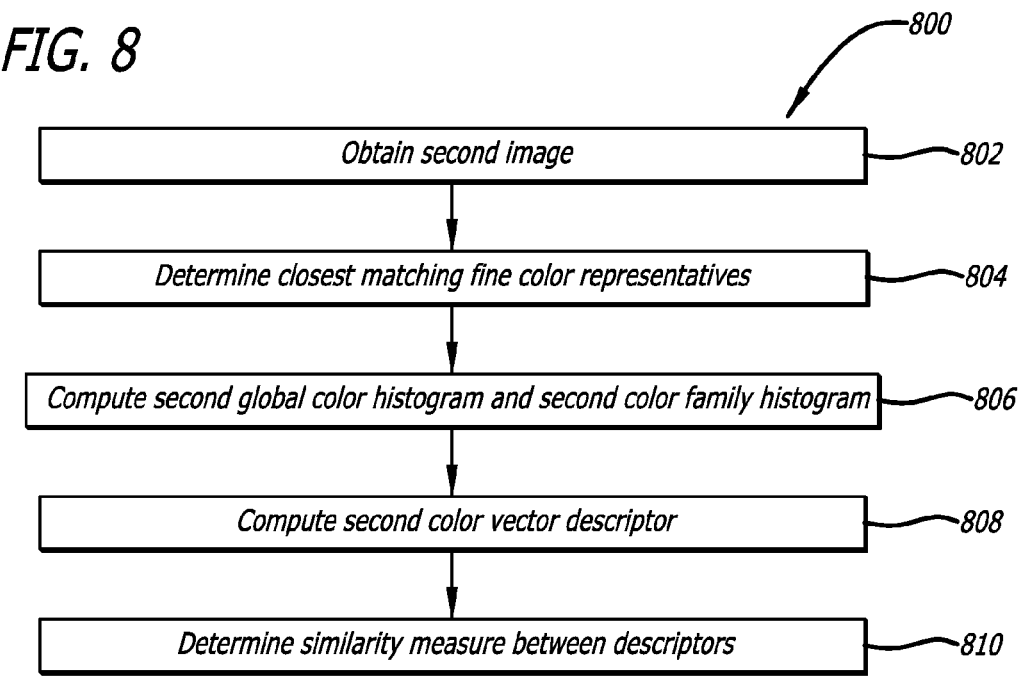
FIG. 8 illustrates an example process for matching color descriptors of two images that can be used in accordance with at least one embodiment.

In order to compare the color content of two images, their descriptors are first computed as described elsewhere herein, and the dot product, or any other distance metric, between these descriptors is used as a measure of color similarity between the two images. FIG. 8 illustrates an example process 800 for comparing color descriptors that can be used in accordance with various embodiments. In this example, a second image to compare to a first image (or a first image to compare against a color) is obtained 802. A closest matching fine color representative for each pixel of the image is determined 804. As discussed elsewhere herein, a global histogram of the closest matching fine color representatives for the image and corresponding family histogram is determined 806. A color vector descriptor is computed 808 from a combination of the global and family histograms and a similarity measure is determined 810 by computing the dot product (or any other suitable distance metric) between a comparison vector descriptor (of an image in an image database or for comparison against a color in general) and the vector descriptor for the obtained image. In at least one example, a similarity score can be calculated based on the distance between the descriptors. Various other types of information and techniques can be utilized or provided as well within the scope of the various embodiments.

Color Descriptor Fabrication

Figure 9:
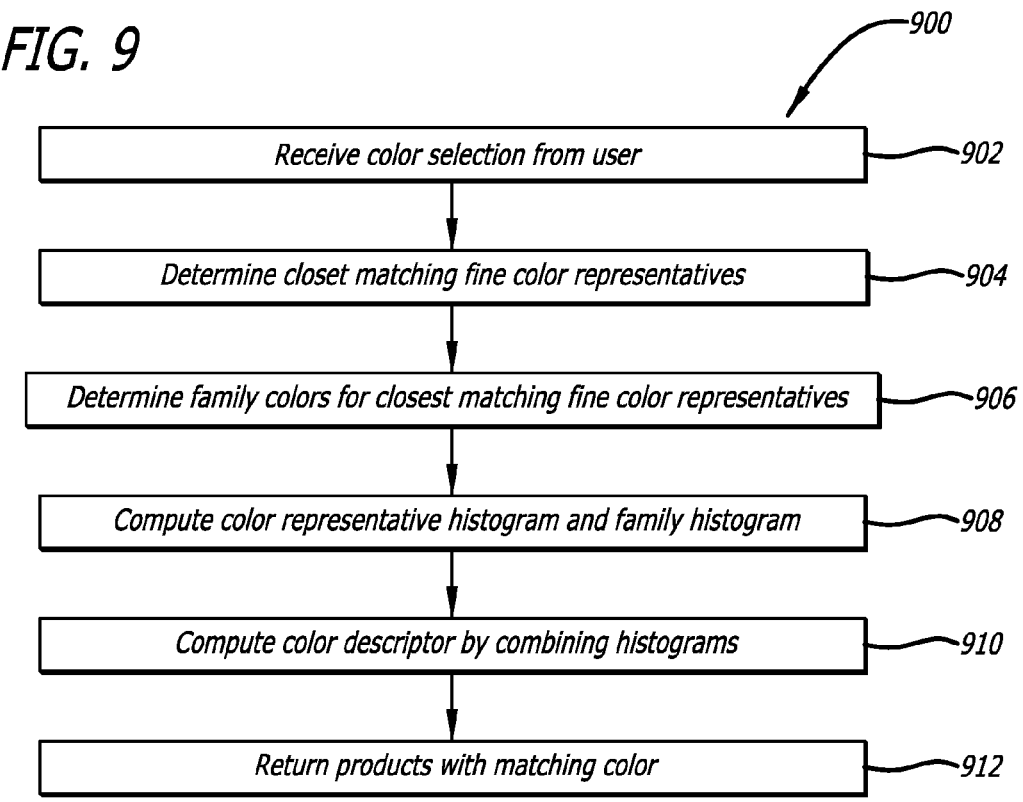
FIG. 9 illustrates an example process for fabricating a color descriptor that can be used in accordance with at least one embodiment.

As discussed elsewhere herein, color can be an important cue for narrowing search results while browsing for a product in an electronic marketplace. In order to facilitate such a browsing or shopping experience that can search or filter by color, each product image will need to be tagged with the color of the product contained therein. However, manually tagging each and every product is not scalable or practical. Therefore, in accordance with at least one embodiment, an automated algorithm discussed herein can analyze the visual content of images and automatically tag the same with color therein. In at least one embodiment, a synthetic color descriptor can be fabricated to compare against product image color descriptors to tag the same for narrowing or filtering search results by color. Further, such a process could be performed in real-time as a search is being requested by a user. FIG. 9 illustrates an example process 900 for fabricating color descriptors that can be used in accordance with various embodiments. For example, a color selection is received 902 by a user. Given the pure color RGB value, N closest fine color representatives are determined 904 along with their associated distances from the nearest pure color representative in either HSV or RGB space. In one example, a fixed decreasing function is used determine these distances. Accordingly, the associated families for each of the closest fine color representatives are determined 906. The family counts along with the associated distances are used to determine 908 histograms for numerical counts of the closest matching fine color representatives and corresponding color family representatives. A descriptor is computed 910 from a combination of color representative and family histograms, which is used to tag the image or identify search results with the computed descriptor. Accordingly, products in accordance with the user's search and color filtering criterion can be returned 912.

Figure 10:
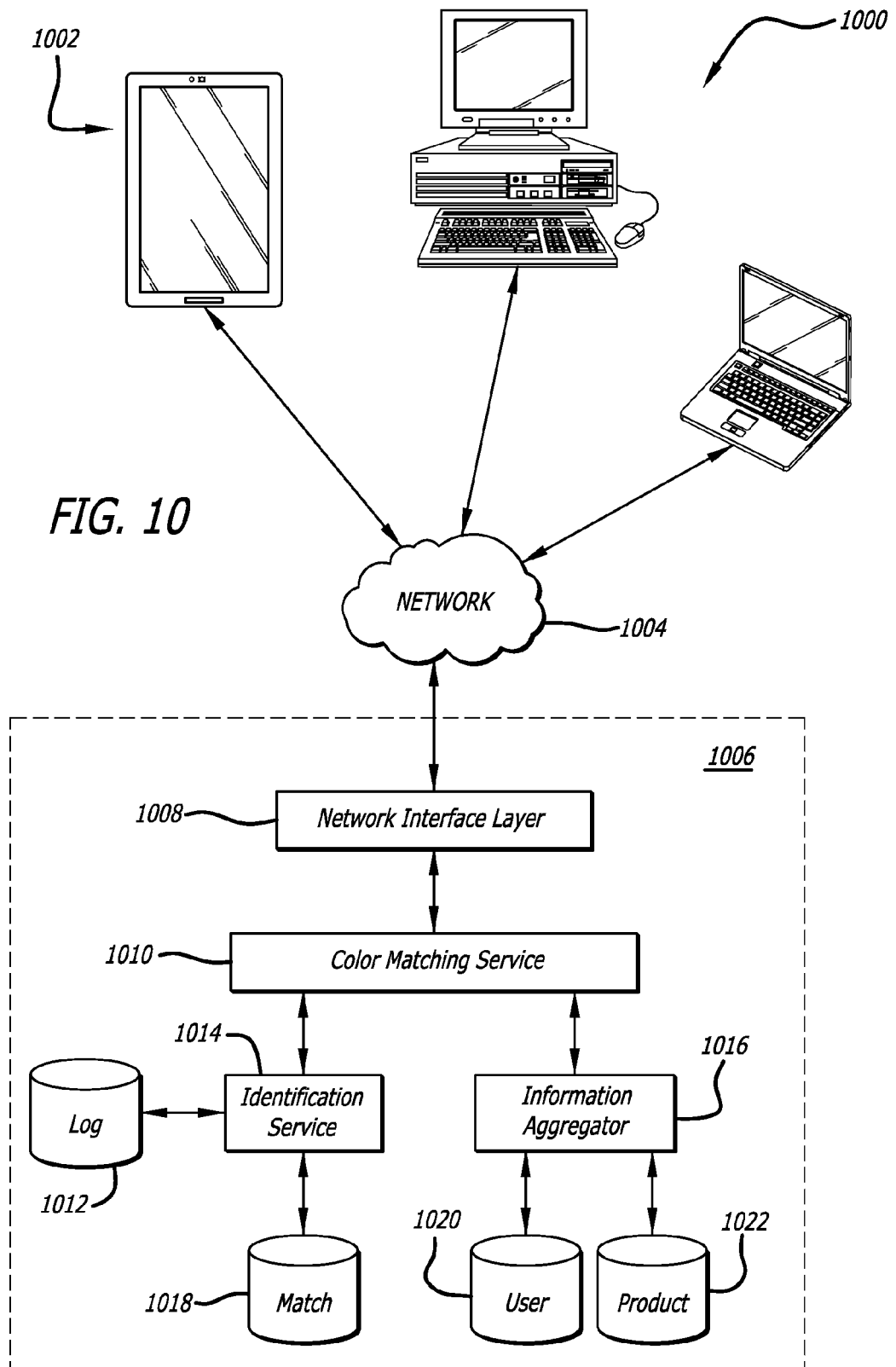
FIG. 10 illustrates an environment in which various embodiments can be implemented.

Histogram descriptors, as discussed herein in a color context, can be used to identify visually similar images or images with similar colors in the collection of content. For example, if a user identifies an image of an item of interest and elects to filter by color, then embodiments search across the collection of content to identify other images of items that are visually similar to the selected item of interest. To do so, embodiments search across other color histogram descriptors of the images in the collection of content to identify one or more images that have color It will be helpful to have reference to an example environment configured to create color histogram descriptors and to use the descriptors to automatically tag, search, and filter content, in accordance with at least one embodiment. FIG. 10 illustrates an example environment 1000 in which information such as search criteria and item color can be submitted by a computing device in order to attempt to obtain information for matching items as a set of search results or other such content. In this example, a user is able to specify an item including a color and other such information using at least one computing device 1002. For example, the computing device can send at least a portion of information across at least one appropriate network 1004, such as may include the Internet, a local area network (LAN), a cellular network, and the like. The request can be sent to an appropriate content provider 1006, as may provide one or more services, systems, or applications for processing such requests.

In this example, the request is received to a network interface layer 1008 of the content provider 1006. The network interface layer can include any appropriate components known or used to receive requests from across a network, such as may include one or more application programming interfaces (APIs) or other such interfaces for receiving such requests. The network interface layer 1008 might be owned and operated by the provider, or leveraged by the provider as part of a shared resource or "cloud" offering. The network interface layer can receive and analyze the request, and cause at least a portion of the information in the request to be directed to an appropriate system or service, such as a color matching service 1010 as illustrated in FIG. 10. A color matching service in this example includes components operable to receive color data for a type of item, analyze the color data of an image, tag the images with color tags, and the like. Further, the system may also return information relating to people, products, places, or things that are determined to match the color data with etc.

The color matching service 1010 in this example can cause information to be sent to at least one identification service 514, device, system, or module that is operable to analyze the contour data and attempt to locate one or more matches. In at least some embodiments, an identification service 1014 will process the received data, such as to extract specific representative color points, then compare the processed data against data stored in a matching data store 1020 or other such location. The data in an image matching data store 1020 might be indexed and/or processed to facilitate with matching, as is known for such purposes.

The color matching service 1010 can receive information from each contacted identification service 1014 as to whether one or more matches could be found with at least a threshold level of confidence, for example, and can receive any appropriate information for a located potential match. The information from each identification service can be analyzed and/or processed by one or more applications of the color matching service, such as to determine data useful in obtaining information for each of the potential matches or products to provide to the user. For example, a color matching service might receive bar codes, product identifiers, or any other types of data from the identification service(s), and might process that data to be provided to a service such as an information aggregator service 1016 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 1016 can utilize the aggregated data from the color matching service 1010 to attempt to locate products, in a product data store 1024 or other such location, which are offered through the marketplace and that match, or are otherwise related to, the potential match information. For example, if the identification service identifies a type or brand of boot with the desired color, the information aggregator can attempt to determine whether instances of that type or brand of boot are offered through the marketplace, or at least for which information is available through the marketplace. In at least some embodiments, the information aggregator can utilize one or more suggestion algorithms or other such approaches to attempt to determine related elements that might be of interest based on the determined matches. In some embodiments, the information aggregator can return various types of data (or metadata) to the environmental information service, as may include item description, availability, reviews, and the like. In other embodiments, the information aggregator might instead return information such as a product identifier, uniform resource locator (URL), or other such digital entity enabling a browser or other interface on the computing device 1002 to obtain information for one or more products, etc. The information aggregator can also utilize the aggregated data to obtain various other types of data as well. Information for located matches also can be stored in a user data store 1022 of other such location, which can be used to assist in determining future potential matches or suggestions that might be of interest to the user. Various other types of information can be returned as well within the scope of the various embodiments.

The color matching service 1010 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device as the information becomes available. The potential matches located by the various identification services can be written to a log data store 1012 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 1006 in FIG. 10, that one or more of these identification services might be operated by third parties that offer these services to the provider.

Figures 11A, 11B:
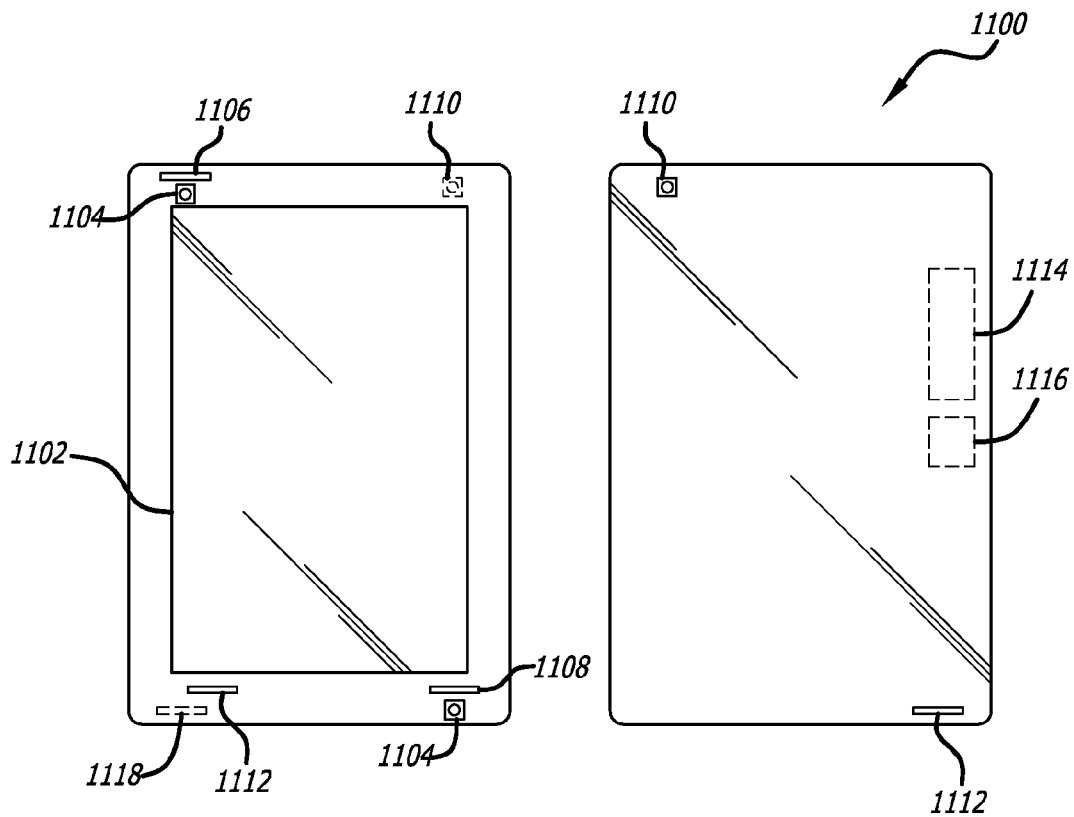
FIGS. 11A and 11B illustrate an example computing device that can be used to implement aspects of various embodiments.

FIGS. 11A and 11B illustrate front and back views, respectively, of an example electronic computing device 1100 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1100 has a display screen 1102 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1104 on the front of the device and at least one image capture element 1110 on the back of the device. It should be understood, however, that image capture elements could also, or alternatively, be placed on the sides or corners of the device, and that there can be any appropriate number of capture elements of similar or different types. Each image capture element 1104 and 1110 may be, for example, a camera, a charge-coupled device (CCD), a motion detection sensor or an infrared sensor, or other image capturing technology.

As discussed, the device can use the images (e.g., still or video) captured from the imaging elements 1104 and 1110 to generate a three-dimensional simulation of the surrounding environment (e.g., a virtual reality of the surrounding environment for display on the display element of the device). Further, the device can utilize outputs from at least one of the image capture elements 1104 and 1110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1108 on the front side, one microphone 1112 on the back, and one microphone 1106 on or near a top or side of the device. In some devices there may be only one microphone, while in other devices there might be at least one microphone on each side and/or corner of the device, or in other appropriate locations.

The device 1100 in this example also includes one or more orientation- or position-determining elements 1118 operable to provide information such as a position, direction, motion, or orientation of the device. These elements can include, for example, accelerometers, inertial sensors, electronic gyroscopes, and electronic compasses.

The example device also includes at least one communication mechanism 1114, such as may include at least one wired or wireless component operable to communicate with one or more electronic devices. The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

Figure 12:
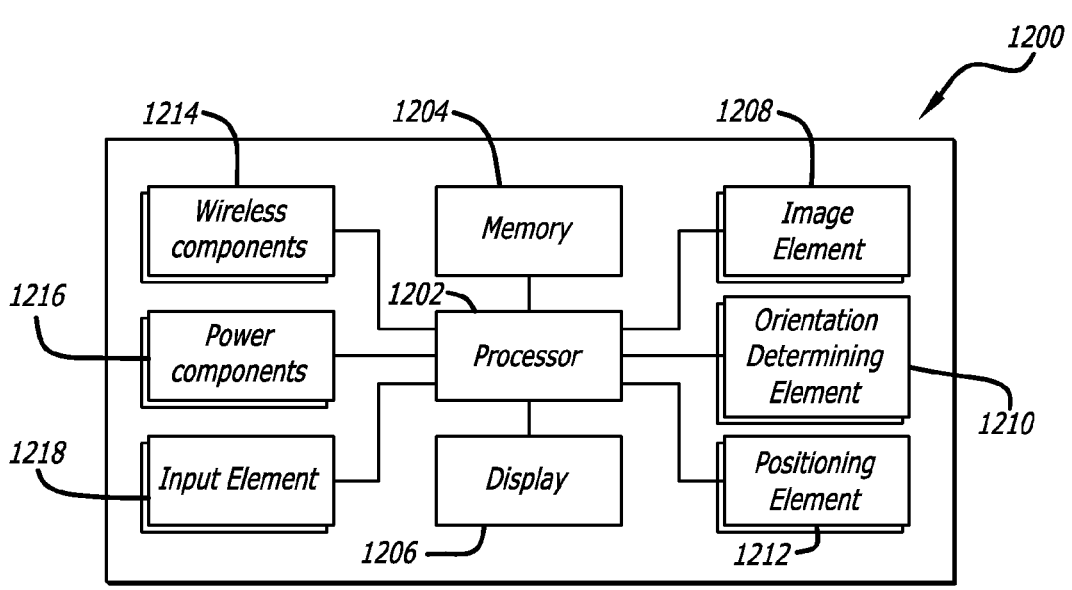
FIG. 12 illustrates example components that can be used with a device such as that illustrated in FIGS. 11A and 11B.

FIG. 12 illustrates a set of basic components of an electronic computing device 1200 such as the device 1100 described with respect to FIG. 11. In this example, the device includes at least one processing unit 1202 for executing instructions that can be stored in a memory device or element 1204. As would be apparent to one of ordinary skill in the art, the device can include many types of memory, data storage, or computer-readable media, such as a first data storage for program instructions for execution by the processing unit(s) 1202, the same or separate storage can be used for images or data, a removable memory can be available for sharing information with other devices, and any number of communication approaches can be available for sharing with other devices.

The device typically will include some type of display element 1206, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1208, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1200 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1200. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1212 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element (s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1214 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1218 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 13:
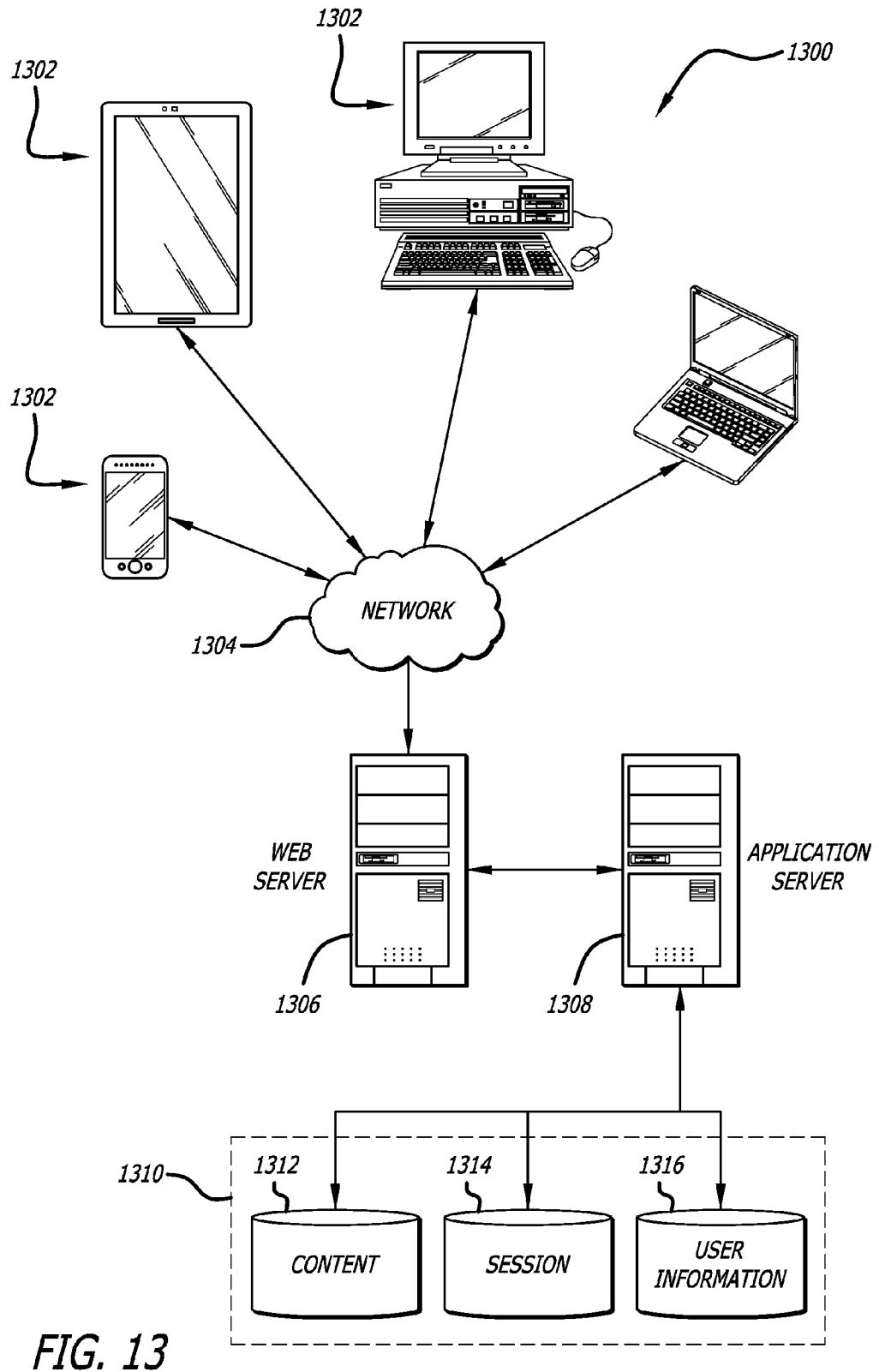
FIG. 13 illustrates another environment in which various embodiments can be implemented.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
assigning a saturation value and a brightness value to a plurality of color hues for each of a plurality of colors;
determining a number of fine color representatives from the plurality of colors to describe color variation in an image as a histogram;
assigning each of the number of fine color representatives to at least one pure color family of a plurality of pure color families;
obtaining a first image including a plurality of pixels;
determining a closest matching fine color representative from the number of fine color representatives for each pixel from at least a portion of the plurality of pixels of the first image, the closest matching fine color representative of the each pixel comprising a respective color included in a color space that is within a distance threshold of a second color in the color space corresponding to the each pixel;
computing a global histogram based at least in part on each of the closest matching fine color representatives of each pixel from at least the portion of the plurality of pixels and a family histogram of at least the one pure color family for each pixel of at least the portion of the plurality of pixels; and
computing a color vector descriptor from a combination of the global histogram and the family histogram, the color vector descriptor used to determine color similarity between the image and a second image.

2. The computer-implemented method of claim 1, further comprising:
obtaining the second image;
determining a closest matching fine color representative for each pixel of a plurality of pixels of the second image, the closest matching fine color representative of the each pixel comprising a second respective color included in the color space that is within a second distance threshold of a third color in the color space corresponding to the each pixel;
computing a second global histogram based at least in part on each of the closest matching fine color representatives of each pixel from the at least a portion of the plurality of pixels for the second image and a second family histogram of at least one pure color family for each pixel of at least the portion of the plurality of pixels of the second image;
computing a second color vector descriptor from a combination of the second global histogram and the second family histogram; and
determining a similarity measure between the first vector descriptor and the second vector descriptor.

3. The computer-implemented method of claim 2, wherein the similarity measure is determined by computing a dot product of the first vector descriptor and the second vector descriptor.

4. The computer-implemented method of claim 1, wherein the number of fine color representatives includes at least one grayscale representative.

5. The computer-implemented method of claim 1, further comprising:
normalizing the color vector descriptor to have a unit Euclidean norm.

6. A computer-implemented method, comprising:
under the control of one or more computer systems configured with executable instructions,
determining a closest color for each pixel of at least a portion of pixels of an image from a set of representative colors, each representative color being assigned to at least one color family, the closest color of the each pixel of at least the portion of pixels comprising a respective color included in a color space that is within a distance threshold of a second color in the color space corresponding to the each pixel;
computing a global color histogram of color representatives corresponding to closest color counts and a color family histogram corresponding to color family counts for at least the portion of pixels; and
computing a color vector descriptor from a combination of the global color histogram and the color family histogram for determining color similarity between the image and at least a second image.

7. The computer-implemented method of claim 6, further comprising:
defining a hue, saturation, and value (HSV) space;
dividing a hue space portion of the HSV space uniformly into a plurality of colors; and
determining the set of color representatives by assigning a saturation value and a brightness value pair to a plurality of hues of the hue space portion.

8. The computer-implemented method of claim 7, wherein more color representatives are assigned to more saturation values for high brightness values relative to color representatives assigned saturation values for low brightness values.

9. The computer-implemented method of claim 6, further comprising:
defining a number of color families, each color family including a plurality of red, green, blue (RGB) color values;
determining a closest RGB color value of the plurality of RGB color values for each of the set of representative colors, the closest RGB color value comprising a respective color included in an RGB color space that is within a distance threshold of a second color in the RGB color space corresponding to the plurality of RGB color values for each of the set of representative colors; and
assigning each of the set of representative colors to one or more color families of the number of defined color families associated with the determined closest RGB color value.

10. The computer-implemented method of claim 6, further comprising:
normalizing the color vector descriptor to have a unit Euclidean norm.

11. The computer-implemented method of claim 6, further comprising:
obtaining the second image;

determining a closest color for each pixel of at least a portion of pixels of the second image, the closest color of the each pixel comprising a second respective color included in the color space that is within a distance threshold of a third color in the color space corresponding to the each pixel;

computing a second global histogram and a second family histogram for the second image;

computing a second color vector descriptor from a combination of the second global histogram and the second family histogram; and determining a similarity measure between the first vector descriptor and the second vector descriptor.

12. The computer-implemented method of claim 11, wherein the similarity measure is determined by computing a dot product of the first vector descriptor and the second vector descriptor.

13. A computing device, comprising:
a processor;
a display screen; and
memory including instructions that, when executed by the processor, cause the computing device to:
determine a closest color for each pixel of at least a portion of pixels of an image from a set of representative colors, each representative color being assigned to at least one color family, the closest color of the each pixel comprising a respective color included in a color space that is within a distance threshold of a second color in the color space corresponding to the each pixel;
compute a global color histogram of color representatives corresponding to closest color counts and a color family histogram corresponding to color family counts for the at least a portion of pixels; and
compute a color vector descriptor from a combination of the global color histogram and the color family histogram, the color vector descriptor used to determine color similarity between the image and a second image.

14. The computing device of claim 13, wherein the instructions, when executed by the processor, further cause the computing device to:
define a hue, saturation, and value (HSV) space;
divide a hue space portion of the HSV space uniformly into a plurality of colors; and
determine the set of color representatives by assigning a saturation value and a brightness value pair to a plurality of hues of the hue space portion.

15. The computing device of claim 13, wherein the instructions, when executed by the processor, further cause the computing device to:
define a number of color families, each color family including a plurality of red, green, blue (RGB) color values;
determine a closest RGB color value of the plurality of RGB color values for each of the set of representative colors, the closest RGB color value comprising a respective color included in an RGB color space that is within a distance threshold of a second color in the RGB color space corresponding to the plurality of RGB color values for each of the set of representative colors; and
assign each of the set of representative colors to one or more color families of the number of defined color families associated with the determined closest RGB color value.

16. The computing device of claim 13, wherein the instructions, when executed by the processor, further cause the computing device to:

obtain a second image;
determine a closest color for each pixel of at least a portion of pixels of the second image, the closest color of the each pixel comprising a second respective color included in the color space that is within a second distance threshold of a third color in the color space corresponding to the each pixel;
compute a second global histogram and a second family histogram for the second image;
compute a second color vector descriptor from a combination of the second global histogram and the second family histogram; and
determine a similarity measure between the first vector descriptor and the second vector descriptor.

17. The computing device of claim 13, wherein the instructions, when executed by the processor, further cause the computing device to:
normalize the color vector descriptor to have a unit Euclidean norm.

18. The computing device of claim 13, wherein at least one of the set of representative colors includes at least one grayscale representative.

19. A non-transitory computer-readable storage medium storing instructions that, when executed by at least one processor, cause a computing device to:
determine a closest color for each pixel of at least a portion of pixels of an image from a set of representative colors, each representative color being assigned to at least one color family, the closest color of the each pixel comprising a respective color included in a color space that is within a distance threshold of a second color in the color space corresponding to the each pixel;
compute a global color histogram of color representatives corresponding to closest color counts and a color family histogram corresponding to color family counts for the at least a portion of pixels; and
compute a color vector descriptor from a combination of the global color histogram and the color family histogram, the color vector descriptor used to determine color similarity between the image and a second image.

20. The non-transitory computer-readable storage medium of claim 19, wherein the instructions that, when executed by at least one processor, further cause the computing device to:
obtain a second image;
determine a closest color for each pixel of at least a portion of pixels of the second image, the closest color of the each pixel comprising a second respective color included in the color space that is within a second distance threshold of a third color in the color space corresponding to the each pixel;
compute a second global histogram and a second family histogram for the second image;
compute a second color vector descriptor from a combination of the second global histogram and the second family histogram; and
determine a similarity measure between the first vector descriptor and the second vector descriptor.

21. The non-transitory computer-readable storage medium of claim 19, wherein at least one of the set of representative colors includes at least one grayscale representative.

22. The non-transitory computer-readable storage medium of claim 19, wherein the instructions that, when executed by at least one processor, further cause the computing device to:
normalize the color vector descriptor to have a unit Euclidean norm.

23. The non-transitory computer-readable storage medium of claim 22, wherein the instructions that, when executed by at least one processor, further cause the computing device to:
- define a number of color families, each color family including a plurality of red, green, blue (RGB) color values;
- determine a closest RGB color value of the plurality of RGB color values for each of the set of representative colors, the closest RGB color value comprising a respective color included in an RGB color space that is within a distance threshold of a second color in the RGB color space corresponding to the plurality of RGB color values for each of the set of representative colors; and
- assign each of the set of representative colors to one or more color families of the number of defined color families associated with the determined closest RGB color value.

24. The non-transitory computer-readable storage medium of claim 23, wherein the instructions that, when executed by at least one processor, further cause the computing device to:
- define a hue, saturation, and value (HSV) space;
- divide a hue space portion of the HSV space uniformly into a plurality of colors; and
- determine the set of color representatives by assigning a saturation value and a brightness value pair to a plurality of hues of the hue space portion.

* * * * *